United States Patent
Samuel et al.

(10) Patent No.: US 10,824,402 B2
(45) Date of Patent: Nov. 3, 2020

(54) BYTECODE GENERATION FROM UML MODELS

(71) Applicants: Philip Samuel, Kerala (IN); Renu George, Kerala (IN)

(72) Inventors: Philip Samuel, Kerala (IN); Renu George, Kerala (IN)

( * ) Notice: Subject to any disclaimer, the term of this patent is extended or adjusted under 35 U.S.C. 154(b) by 0 days.

(21) Appl. No.: 15/767,252

(22) PCT Filed: Oct. 15, 2015

(86) PCT No.: PCT/IN2015/000389
§ 371 (c)(1),
(2) Date: Apr. 10, 2018

(87) PCT Pub. No.: WO2017/064722
PCT Pub. Date: Apr. 20, 2017

(65) Prior Publication Data
US 2019/0079738 A1    Mar. 14, 2019

(51) Int. Cl.
*G06F 8/35* (2018.01)
*G06F 8/10* (2018.01)
(Continued)

(52) U.S. Cl.
CPC ............... *G06F 8/35* (2013.01); *G06F 8/10* (2013.01); *G06F 8/427* (2013.01); *G06F 8/433* (2013.01);
(Continued)

(58) Field of Classification Search
CPC ....................................................... G06F 8/35
(Continued)

(56) References Cited

U.S. PATENT DOCUMENTS

| | | | |
|---|---|---|---|
| 8,495,560 B2* | 7/2013 | Dangeville | G06F 8/35 715/700 |
| 8,578,346 B2* | 11/2013 | Chao | G06F 8/10 717/132 |

(Continued)

OTHER PUBLICATIONS

Usmant et al., Automatic Generation of Java Code from UML Diagrams using UJECTOR, Apr. 2009, International Journal of Software Engineering and its Applications vol. 3, No. 2 (Year: 2009).*

(Continued)

*Primary Examiner* — Chat C Do
*Assistant Examiner* — Bradford F Wheaton
(74) *Attorney, Agent, or Firm* — D'Ambrosio & Menon, PLLC; Usha Menon

(57) ABSTRACT

Unified Modeling Language is a general purpose modelling language used in the field of software development to easily visualize the systems by specifying the static and dynamic aspects of the system. The conventional way of implementing design models is by writing programs in high level languages like java by a programmer. Our method automatically generates platform independent executable code in the form of bytecode without a programmer and it can be executed on any platform. The design models comprising of class and activity diagrams after parsing and syntax verification are converted to an autobytecode model. The autobytecode model is further processed to determine the execution sequence comprising of loops, sequential and conditional statements. The execution sequence, the actions and attributes associated with the nodes in the execution sequence are analyzed to automatically generate complete bytecode directly from the autobytecode model created from design models.

11 Claims, 6 Drawing Sheets

(51) Int. Cl.
  *G06F 8/41* (2018.01)
  *G06F 9/445* (2018.01)
  *G06F 11/36* (2006.01)

(52) U.S. Cl.
  CPC ...... *G06F 9/44589* (2013.01); *G06F 11/3604* (2013.01)

(58) Field of Classification Search
  USPC .......................................................... 717/104
  See application file for complete search history.

(56) References Cited

U.S. PATENT DOCUMENTS

| | | | |
|---|---|---|---|
| 9,311,434 B1* | 4/2016 | Berg | G06F 30/367 |
| 2003/0182292 A1* | 9/2003 | Leong | G06F 9/4493 |
| 2004/0060037 A1* | 3/2004 | Damm | G06F 3/04883 717/104 |
| 2007/0094542 A1* | 4/2007 | Bartucca | G06F 11/3672 714/38.1 |
| 2011/0179007 A1* | 7/2011 | Shi | G06F 16/958 707/706 |
| 2014/0269422 A1* | 9/2014 | Filsfils | H04L 41/12 370/254 |

OTHER PUBLICATIONS

Usman, Muhammad et al: "Automatic Generation of Java Code from UML Diagrams using UJECTOR" International Journal of Software Engineering and Its Applications vol. 3, No. 2, Apr. 2009.
Jim, Sabrina L. "From UML diagrams to behavioural source code", Sep. 7, 2006.
International Search Report and Written Opinion dated Apr. 12, 2016 for related PCT App. No. PCT/IN2015/000389.

* cited by examiner

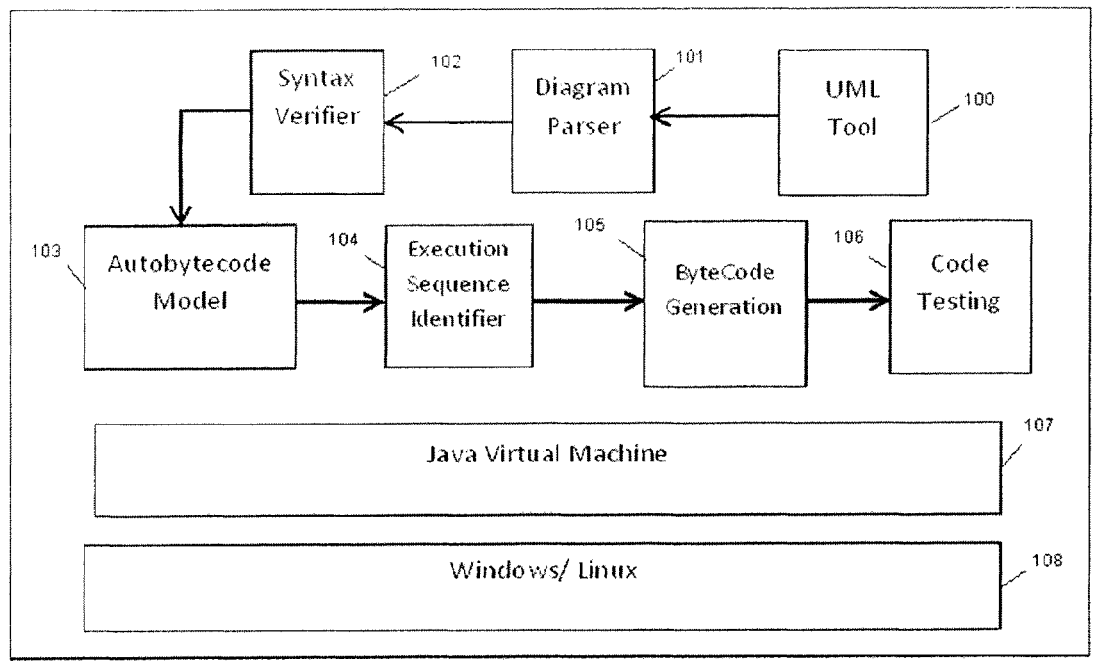
Fig. 1
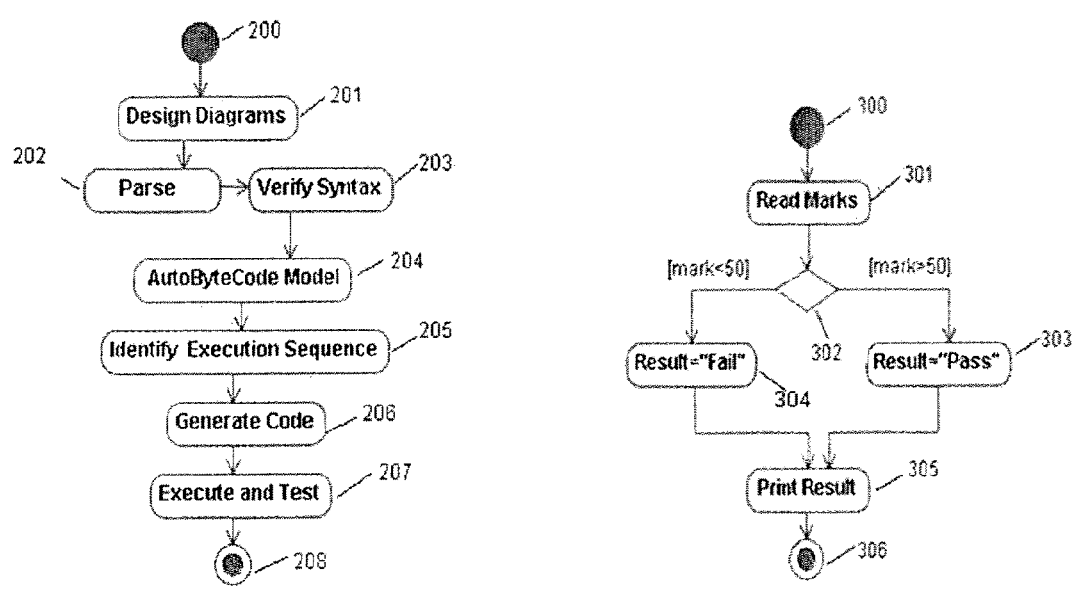
Fig. 2                    Fig. 3

BYTECODE GENERATION FROM UML MODELS

TECHNICAL FIELD

Our invention describes the processing of an autobytecode model created from Unified Modeling Language (UML) models to generate bytecode which is executable code facilitating execution of the design models.

BACKGROUND ART

Object oriented models have been accepted today as the de-facto standard for modelling of software systems in industry. To generate computer software for any application, the analyst performs a requirement analysis about the user needs and models the requirements to appropriate design diagrams. A standard language like UML is commonly used for modelling the requirements. UML provides a graphical representation of the system.

UML provides different diagrams for modelling the various aspects of the system. Class diagrams are used to model the static aspects. Class diagrams provide information about the classes that are present, the information about the attributes and methods of each class and how they are related.

Dynamic or behavioural aspects are modelled using activity diagrams, sequence diagrams and statechart diagrams. Activity diagram provides a high level description of the control flow in a program. An activity diagram is a collection of nodes and edges. Nodes represent computation and edges represent flow of control. The node type determines the type of computation. The sequential flow, concurrent flow as well as loops and conditional constructs can be represented by the activity diagram. The steps in the implementation of methods in class diagrams can be represented using activity diagram. There is a one to one mapping between a method in the class diagram and an activity diagram. To ensure software quality, a syntax verification process is performed on the components of the diagram. The syntax verifier verifies the components of the diagram against their syntactic specification to ensure syntactic correctness thereby ensuring software quality.

The syntactically correct diagrams are converted to an autobytecode model and the autobytecode model is analyzed to detect the control flow in the diagram thereby identifying the execution sequence. The bytecode generation is based on a mapping from the autobytecode model to executable bytecode based on the execution sequence. Automating the process of bytecode generation helps to maintain consistency between the models and code generated.

DISCLOSURE OF INVENTION

We have invented a method to generate executable bytecode from an autobytecode model. In conventional methods, a human being or programmer has to write a computer program based on the design model and this program is converted into bytecode using a compiler like java compiler. The conventional way of writing computer program in a high level programming language like Java is not needed in our invention, as we generate executable in the form of bytecode automatically from the design model. Our method consists of a computer program and a system that consists of a processor, data storage (volatile and non-volatile memory), input device and output device. The computer system should have a UML tool and a Java Virtual Machine (JVM) and it should have either Windows or Linux as the operating system. Our claim includes a method that allows for automatic generation of efficient and accurate executable bytecode from an autobytecode model comprising of the specifications of the class and activity diagrams.

The method according to the embodiment of disclosure generates executable bytecode from the autobytecode model without writing a computer program.

The method according to the embodiment of disclosure automates the process of bytecode generation which helps to bypass the role of programmer as well the process of code generation.

The method according to the embodiment of disclosure performs syntax check on the components of the diagram.

The method according to the embodiment of disclosure identifies the sequential flow of execution.

The method according to the embodiment of disclosure identifies loops and conditional construct such as if-then-else.

The method according to the embodiment of disclosure maintains consistency between the models and code generated.

The method according to the embodiment of disclosure executes the design models directly on any platform.

BRIEF DESCRIPTION OF THE DRAWINGS

FIG. 1 shows the development frame work for converting an autobytecode model generated from syntactically correct UML class and activity diagrams to bytecode according to the embodiments of the invention.

FIG. 2 shows an activity diagram for converting autobytecode model to bytecode and executing the bytecode to generate the required result.

FIG. 3 shows an example activity diagram illustrating an if-then-else conditional construct.

BEST MODE OF IMPLEMENTATION

Figure 4:
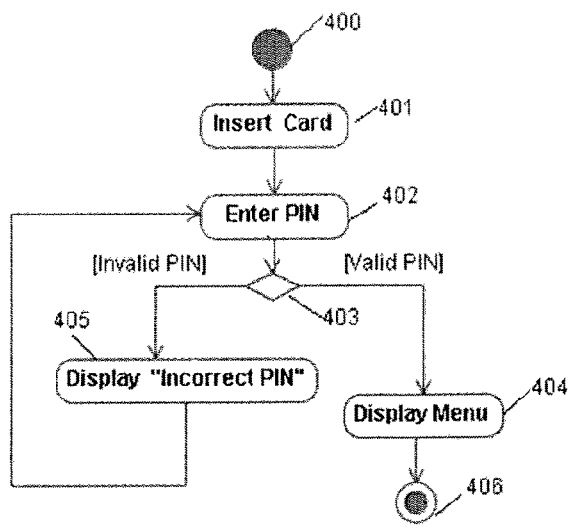
FIG. 4 shows an example activity diagram illustrating a loop.

FIG. 1 shows the development framework for generating executable bytecode from UML models. The system includes UML tool, UML diagram parser, syntax verifier, autobytecode model, execution sequence identifier, bytecode generation unit and bytecode testing unit.

The analyst collects the requirements from the user and the system designer translates the requirements to class diagram and activity diagrams using a UML tool in 100. Any UML tool can be used to create the models and any application can be designed using UML diagrams.

The diagram parser in 101 parses the models and produces a specification of the diagram. The specification includes all the required information about class diagrams such as attributes and methods of the class. The specification also includes information about the nodes and transitions in the activity diagram.

The system further includes a syntax verifier module. The syntax verifier in 102 validates each component of the diagram against their syntactic specification and reports errors if any. An autobytecode model comprising of class and activity diagram specification is generated in 103. The execution sequence identifier module in 104 traverses the diagram and identifies sequential flow, loops and conditional constructs.

The bytecode generation module in 105 generates executable bytecode using the information provided by autobytecode model. The function of the code test unit in 106 is to test the generated executable bytecode against the requirements provided by the user. The java virtual machine in 107 executes the bytecode to produce result. The operating system in 108 can be either Windows or Linux.

FIG. 2 represents a high level activity diagram for converting the autobytecode model to executable bytecode according to the embodiments of the invention. The class and activity diagrams are processed in various stages. Step 200 corresponds to the initial node which indicates the beginning of control flow. In step 201, the class diagrams depicting the static structure and activity diagrams depicting the dynamic behaviour are designed using a UML tool in accordance with the requirement specification.

In step 202, the design diagrams are parsed to obtain a specification of the diagram. The parser identifies the various syntactic elements that constitute the diagram. The attributes and their data types, methods, its parameters and return type are identified. The different components of the activity diagram such as initial node, final node, action states, decision nodes, edges and guard conditions are extracted. The information pertaining to the components of the diagram are stored in the corresponding data structures to generate the autobytecode model.

The specification obtained in step 202 is used by the syntax verifier in step 203 to verify syntactic correctness. Each component of the diagram should conform to its syntactic specification. The syntax verifier operates on the specification of the diagram by analyzing each component and reports the errors found in a separate data structure called the error table.

After system design, parsing and syntax verification, the syntactically correct specification of the models are converted to an autobytecode model in step 204. The execution sequence is determined in step 205 from the autobytecode model. The execution sequence may be sequential involving a set of action nodes or it may be a loop or conditional statement involving a decision node and a set of action nodes. A decision node usually represents a Boolean expression. The control flow divides into two or more branches at the decision node. A conditional statement is an if-then-else statement and it starts with a decision node where the control forks into two or more branches. Each branch has action nodes specifying the activities performed in the branch. All the branches finally merge at an action node. The conditional statement consists of the decision node and the action nodes along the branches and the action node where all the branches converge.

FIG. 3 depicts the activity diagram for a conditional statement. The activity diagram reads the marks of a student, compares the marks with 50, computes the result as either pass or fail based on the comparison and prints the result. The initial node is represented in step 300. The action node in step 301 reads the marks of a student. The decision node in step 302 validates the marks. If the mark is greater than 50, control flows to step 303, else control flows to step 304. In step 303, the result of the student is entered as "Pass" since his mark is greater than 50. In step 304, the student result is entered as "Fail" since the marks scored by him are less than 50. After processing of marks in either step 303 or 304, control flows to an action node 305 where both the Then and Else branches merge. In step 305 the action node prints the result as either Pass or Fail and control flows to the final node in step 306.

A loop consists of a decision node and a set of action nodes representing the body of the loop. One of the branches of the loop terminates at a previously visited node. Loops and conditional constructs are identified on encountering a decision node.

FIG. 4 depicts the activity diagram for validating PIN in an ATM system. The ATM system contains a simple loop. Control flow begins from the initial node 400. The ATM card is inserted in step 401 and the PIN is entered in step 402, The decision node in step 403 validates PIN. There are two outcomes: valid PIN or invalid PIN. If the PIN is valid control flows to step 404 which displays the menu for proceeding with the transaction and finally to the final node in step 406. In case of invalid PIN control flows to step 405 which displays the message "Incorrect PIN" and to the previously visited action node 402 which prompts the user to re-enter the PIN. This path forms a loop. The loop involves the action node 402, the decision node 403 and the action node 405.

Corning back to FIG. 2, step 206 generates executable bytecode from the autobytecode model. Bytecode generation procedure starts from the initial node and terminates at the final node. Control flow analysis is performed on the autobytecode model for executable code generation. The execution sequence obtained in step 205 determines the order in which the nodes are processed and bytecode instructions are generated. The action nodes and decision nodes are processed and mapped to the corresponding bytecode instructions during executable bytecode generation. Step 207 corresponds to the execution and testing of executable bytecode generated. The execution process consists of compiling the bytecode generated and executing. Testing is performed to ensure accuracy of bytecode generated thereby ensuring software quality. Step 208 corresponds to the final node where all computations terminate.

Figure 5:
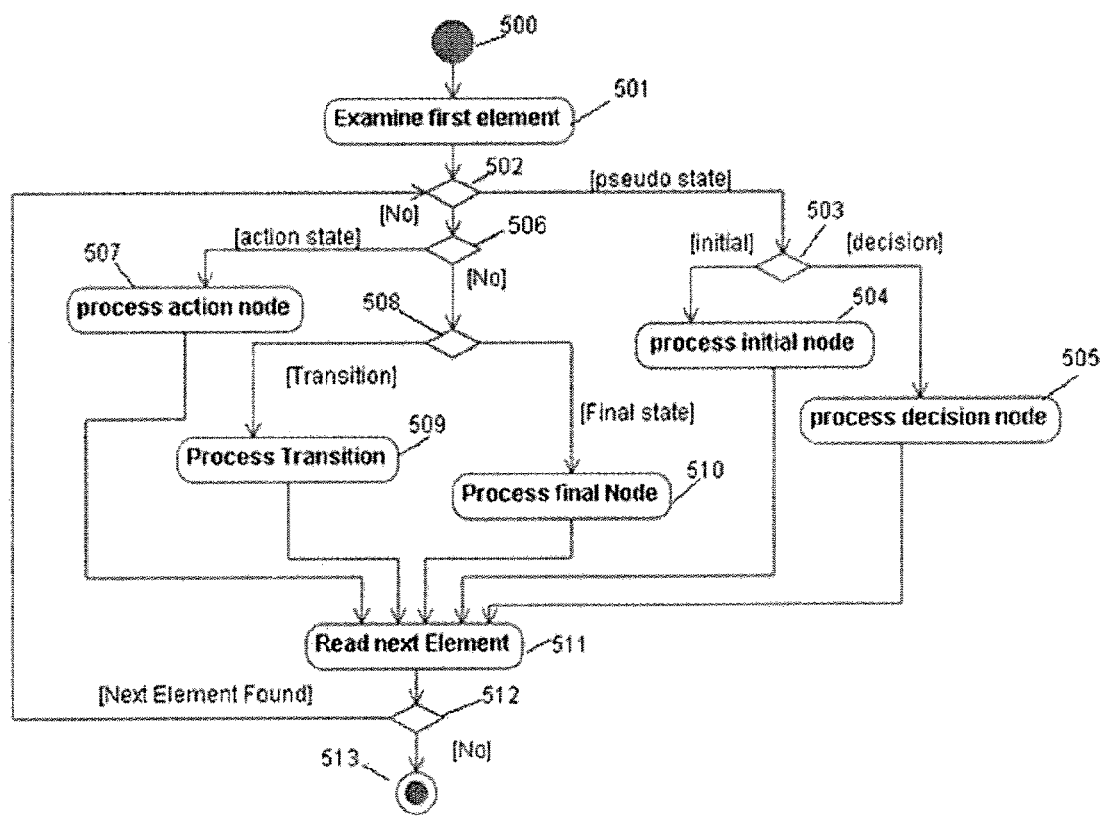
FIG. 5 shows an activity diagram for parsing the activity diagram to identify the components of the diagram.

FIG. 5 represents the diagram for parsing the UML activity diagram. The activity diagram is a collection of initial node, final node, action nodes, decision nodes, branches, guard conditions and transitions. The aim of parsing is to extract each component of the diagram and store in the corresponding data structures in memory. Syntax checking is performed on the diagram components. Control flow begins from the initial node in step 500. In step 501, the first element is examined. The decision nodes in steps 502, 506 and 508 analyzes the type of the element. The element can be a pseudo state, action state, final state or a transition. Step 502 examines the current element and checks whether it corresponds to a pseudo state. If the current element is a pseudo state control flows to step 503, else control flows to step 506. A pseudo state can represent either a decision node or an initial node. In step 503, if the current element is a decision node, control flows to step 505 where the decision node is processed. If the current element is an initial node, control flows to step 504. The name, id and type of node is obtained in step 505 and stored in memory for use in later stages of executable code generation. The information about the branches from the decision node and guard conditions on the branches are also stored in memory. In step 504, the initial node is processed and stored in memory.

The decision node in step 506 checks whether the current element is an action state. If it is an action state, control flows to step 507, else control flows to step 508. In step 507, the action node details such as node name and id are obtained and stored in a separate data structure in memory for use during the later stages of executable code generation.

Step 508 corresponds to identifying the current element, if it is a transition control flows to else if it is a final node control flows to 510. In step 509, the specifications of the transitions such as source, target, guard conditions, transition id are obtained and stored in a separate data structure in memory. The information pertaining to the transitions are used to identify the execution sequence as well as during executable code generation. In step 510, the id of the final node is obtained and stored in a separate data structure. Step 511 corresponds to reading the next element. After performing the processing of steps 504, 505, 507, 509, 510 control flows to step 511. Step 512 is a decision node that checks whether next element exists. If there are unprocessed elements, control flows to the decision node in 502, else control flow terminates in step 513. Steps 502 to 512 forms a loop that reads elements, identifies the type of element, processes them and stores information of the nodes in separate data structures in memory. After processing of the diagram, components of the diagram and information pertaining to each component are available in separate data structures stored in memory.

Figure 6:
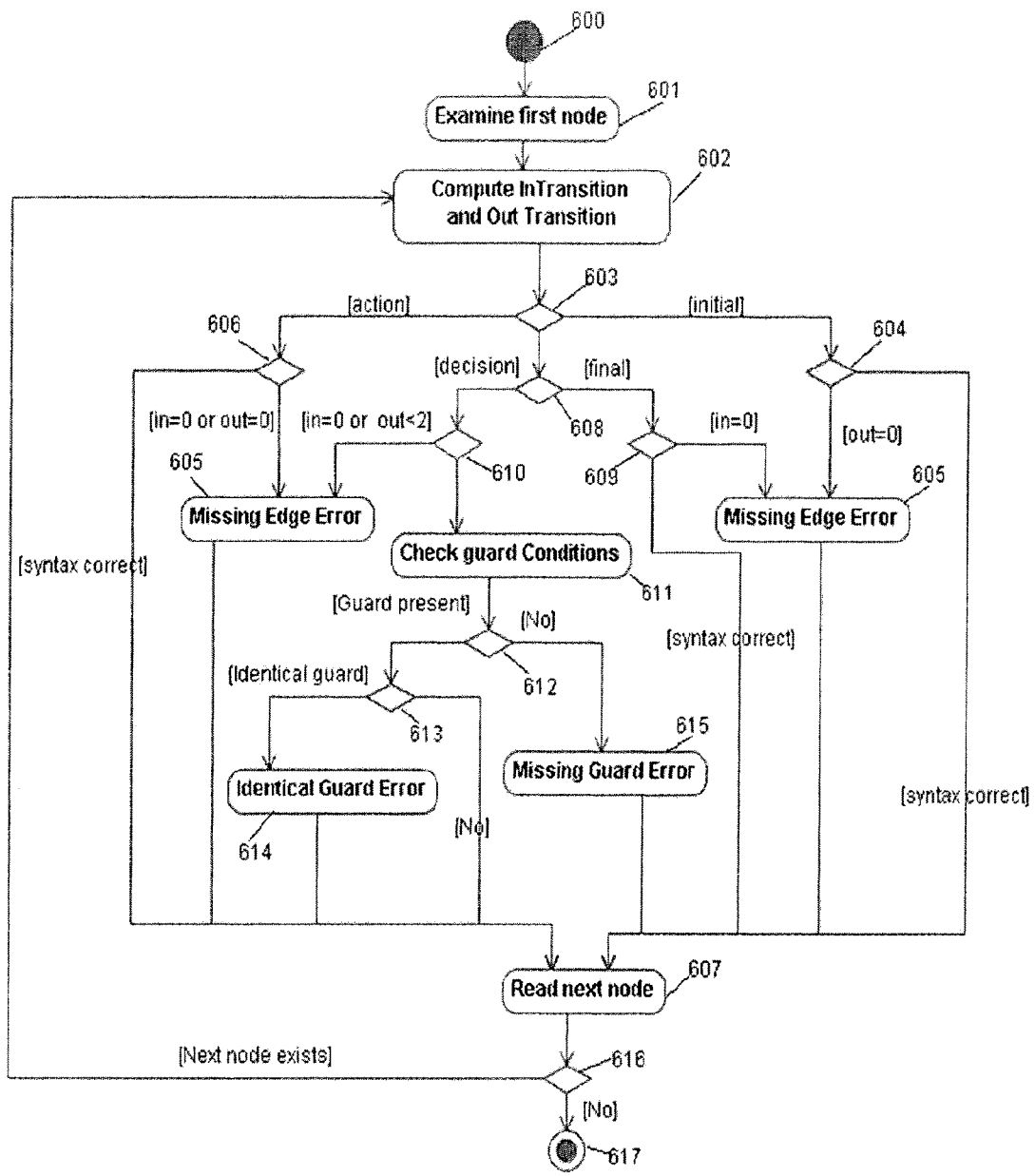
FIG. 6 shows an activity diagram for performing syntax check on the components of the diagram according to the embodiments of the invention.

FIG. 6 depicts the activity diagram for syntax verification process. During design phase, errors can occur. A situation in which there are no incoming edges to any node except initial node or no outgoing edge from any node except final node leads to missing edge error. Missing edges result in a break in control flow. Identical or missing guard conditions associated with the branches and guard conditions can also lead to error during executable bytecode generation.

Control flow begins from node 600. In step 601, the first element which is usually the initial node is examined. For each node, compute the number of transitions with current node as the source (outgoing transitions) and the number of transitions with current node as the target (incoming transitions). Step 602 performs this computation. The data structure storing information about transitions computed in step 509 is accessed for performing the computation. Steps 602 to 616 are executed in a loop until all the nodes are examined. The decision node in step 603 determines the node type. If the current node is an action node step 606 is executed, if it is an initial node, step 604 is executed else control flows to the decision node in step 608.

In step 604, the syntax of initial node is verified. The syntactic specification is that an initial node should have an outgoing edge. If this condition is violated, missing edge error is reported in step 605. If the syntax is correct, control flows to step 607. In step 606, the syntax of the action node is checked. An action node occurs in between an initial node and final node, hence it should have incoming and outgoing edges. In situations where the branches of decision node merge or in situations where the action node is the target of a loop statement, an action node can have more than one incoming edge. Action node is used to specify computations, so it must have an outgoing edge. The decision node in step 606 checks whether the number of incoming transitions is equal to zero or the number of outgoing transitions is equal to zero. If the Boolean expression evaluates to true, the error missing edge is reported in step 605, else control flows to step 607. After storing error in a separate data structure in memory in step 605, control flows to step 607 to read the next node.

Step 608 checks whether the current node is a final node or a decision node. If the decision check in step 608 determines that the current node is a decision node, control flows to step 610 else control flows to step 609. A final node is the last node in the diagram. The final node depicts the end of control flow. Hence it has only incoming edges and no outgoing edge. The decision node in step 609 checks whether there are incoming edges to the final node. If the number of incoming edges is zero, missing edge error is reported in step 605, else control flows to step 607.

Steps 610 to 615 correspond to the syntax checking of the decision node. Step 610 analyzes the count of incoming and outgoing transitions. A decision node evaluates a Boolean expression and control forks into two or more branches depending on the result of evaluation. So a decision node should have at least one incoming edge and at least two outgoing edges. A violation of these conditions leads to the missing edge error in step 605. Step 611 analyzes the guard conditions on the branches leaving decision node. To be syntactically correct, all the edges leaving the decision node should be labeled with mutually exclusive guard conditions. Step 612 checks whether guard conditions are present. If guard conditions are not present, missing guard error is reported and stored in the error table in step 615. If guard conditions are present, step 613 compares the guard conditions. Guard conditions determine which among the alternate paths are to be followed after evaluating the Boolean expression in the decision node. If the guard conditions are found identical in step 613, the error identical guard condition is stored to error table in step 614. If the guard conditions are mutually exclusive, control flows to step 607. The errors identified in steps 605, 614 and 615 are stored in a separate data structure named error table in memory. The error table contains information about the error type and the node in which the error occurs.

After performing the syntax check on the current node, the next node is read in step 607. The decision node in step 616 checks whether next node exists. If such a node exists, control branches to step 602, else the syntax checking process terminates at the final node in step 617. After performing the syntax check, an autobytecode model is created and is used to determine the execution sequence.

Figure 7:
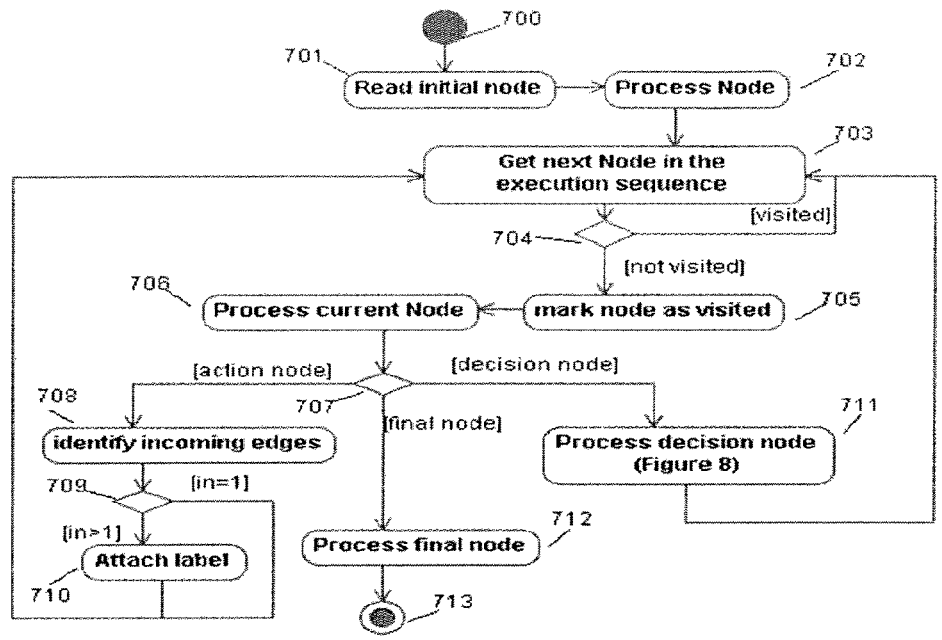
FIG. 7 shows an activity diagram for identifying the execution sequence according to the embodiments of the invention.

FIG. 7 represents the activity diagram for identification of execution sequence. Activity diagrams represent sequential control flow, loops and conditional statements. To identify the execution sequence, the autobytecode model is analyzed. Separate data structures are maintained for sequential flow, loop and conditional constructs.

Processing starts with step 700. The initial node of the activity diagram is examined in step 701. The node is marked as visited and added to data structure for storing information about nodes in the sequential control flow in step 702. The nodes after examination are added to a data structure and marked as visited. The visited flag serves to identify the nodes that are explored. Identification of the execution sequence starts with the initial node. A depth first search algorithm is performed on the autobytecode model to identify the nodes in the execution sequence. Step 703 identifies the next node in the execution sequence. The sequential execution consists only of action nodes and initial and final node.

The current node determined in step 703 is analyzed in step 704. If the current node is visited, it is added to the list and no further processing of the node is performed and control flows to step 703. Steps 703 and 704 constitute a loop to identify the next non visited node. In case of a non-visited node control flows to step 705 from step 704 which marks the node as visited. After attaching the visited label, the node is processed in step 706. The decision node in step 707 determines the node type and control branches accordingly.

Steps 708 to 710 correspond to the processing of action node. In the case of conditional construct, the action node where the Then and Else branches merge has two incoming edges. In the case of a loop, an action node which is the target of a branch has two incoming edges. In both cases, a label is attached, with the action node. During coding, a branch to the corresponding node can be implemented using a goto statement to the label of the node. Step 708 identifies the incoming edges and the decision node in step 709 checks the number of incoming edges. If the number is greater than one, a label is attached to the node in step 710 and control flows to examining the next node in step 703. If the count is equal to one control flows to step 703.

If it is determined in step 707 that the current node is a decision node, control flows to step 711. Processing of the decision node in step 711 is detailed in FIG. 8. After processing decision node, the next node in the execution sequence is obtained in step 703. If step 707 determines that the current node is a final node, processing of final node occurs in step 712. The final node is added as the last node in the execution sequence in step 712 and control flow ends at the node in step 713.

Figure 8:
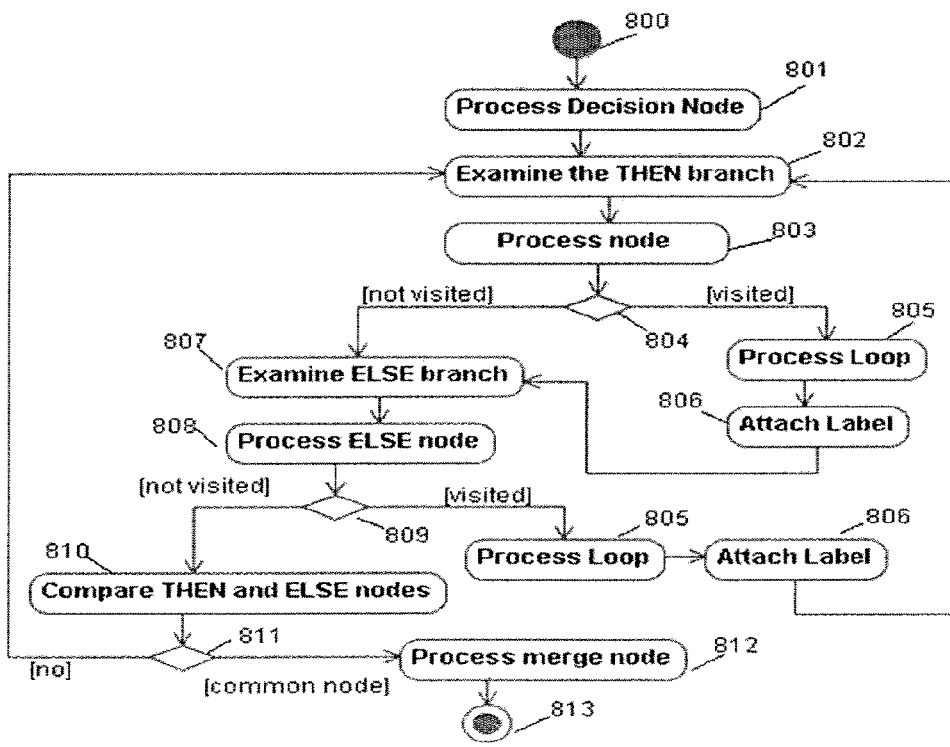
FIG. 8 shows an activity diagram for processing the decision node to identify loops and conditional constructs according to the embodiments of the invention.

FIG. 8 depicts the activity diagram for the processing of decision node to identify loops and conditional statements. Usually decision nodes are associated with conditional constructs such as If-Then-Else or with looping statements. Step 800 represents the initial node and step 801 corresponds to processing of the decision node. The Then and Else branches of a decision node are stored in separate data structures in memory. The guard conditions on edges emanating from the decision node determines the Then and Else branches.

Step 802 examines the Then branch. The nodes in the Then branches are processed in step 803. A label is associated with the first node of the Then branch and added to the list of nodes associated; with Then branch. The decision node in step 804 checks whether the node is an already visited node. During loop processing, one the branches will lead to an already visited node. If the current node is visited, a loop structure is encountered, and the node is added to the data structure corresponding to the loop and stored in memory for later use in step 805. To branch to the node during bytecode generation, a loop label is associated with the node in step 806. After processing of the node in in step 806, the Else branch is examined in step 807.

In the decision check of step 804, if the current node is not visited it is added to the list of nodes corresponding to the conditional construct and the first node in Else is examined in step 807. The node is processed and added to the list of Else nodes in step 808. In the case of the first node of Else branch, an else label is attached in step 808. If the current node is found to be visited in step 809, control flows to step 805.

If the current node is an unvisited node, control flows to step 810 which compares the Then and Else lists to identify a common action node where both the Then and Else branches merge. If a common node is encountered in step 811, a condition label is attached to the node and the action node is added as the last node in the Then and Else lists in step 812. If both the lists do not have a node in common, control flows from step 811 to step 802 to identify the next node in the Then branch. Identification of loops and conditional statements stops at step 813 after all the nodes in Else and Then branches have been explored.

Figure 9:
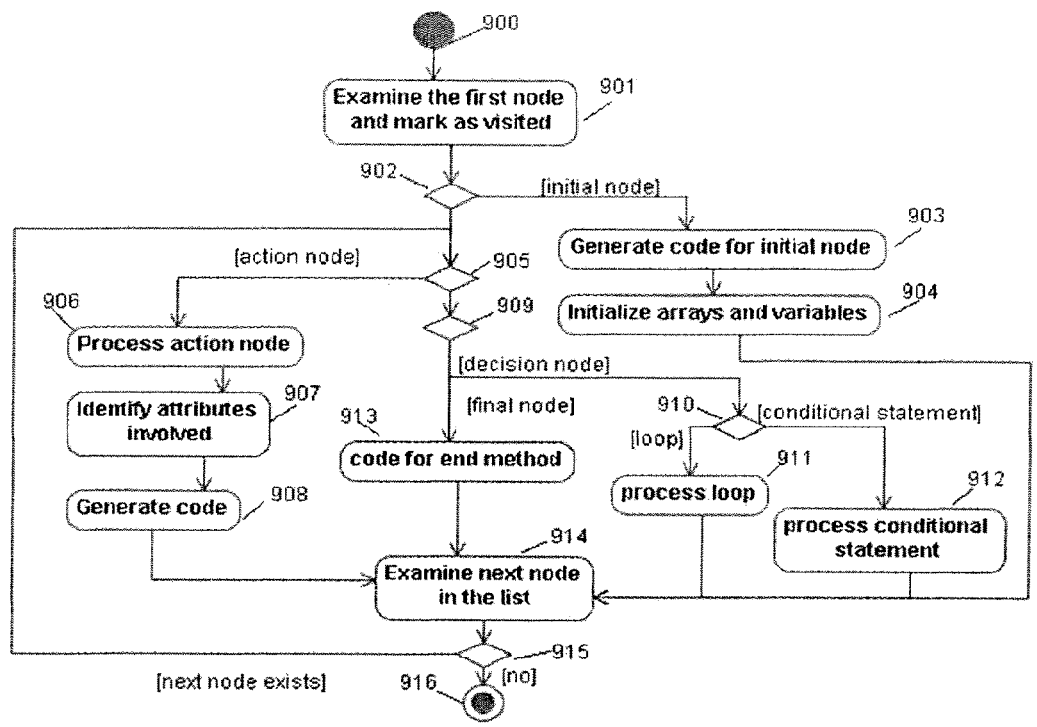
FIG. 9 shows an activity diagram for performing bytecode generation by examining the control flow and nodes involved according to the embodiments of the invention.

FIG. 9 represents the activity diagram for generation of executable bytecode. The execution sequence obtained in step 205 after processing of the autobytecode model is stored in separate data structures in memory. The execution sequence and the autobytecode model is input to the bytecode generator. Step 900 corresponds to the initial node. Step 901 examines the first node in the sequential execution sequence list. Each node after examination for bytecode generation is marked as visited. The node type is checked in step 902. If initial node is encountered, control branches to step 903 else control branches to step 905.

In step 903, a bytecode file is created and bytecode for the init method is written to the bytecode file. Every bytecode file contains a code segment for the init method. Step 904 examines the attributes defined in the class diagram and writes bytecode for initializing arrays and attributes. The attributes and their type are obtained from the data structure obtained as a result of parsing the class diagram.

Step 905 checks whether the current node is an action node. If yes, control branches to step 906, else control flows to step 909. Step 906 processes the action node. The action node is marked as visited. The action associated with the node, the attributes involved in generating the executable code, and the label associated with the action node are identified in step 907. After obtaining the information required for generating executable bytecode, the action node is mapped to the corresponding code and written to the bytecode file in step 908.

Step 909 checks whether the current node is a decision node or final node. In case of decision node, control branches to step 910 and to step 913 in case of final node. Step 910 processes the decision node. A decision node can be involved in a loop or a conditional statement. The conditional statement list and loop statement list obtained as a result of processing the activity diagram of FIG. 8 are used to determine whether the decision node is part of a loop or conditional statement. If the decision node is part of a loop, control branches to process loop in step 911 and to step 912 if the decision node is part of a conditional statement. Executable bytecode generation for the loop and conditional statement is based on the processing of the corresponding lists stored in memory. Bytecode generation of the loop and conditional statements are detailed in FIG. 10 and FIG. 11. After executable bytecode generation of the loop and conditional statements, control flows to step 914 to examine the next node in the execution sequence.

A final node is the last node in the activity diagram. A bytecode file has the code for init method as well as the code for end method. On encountering a final node which denotes the end of control flow or end of processing, the executable bytecode for end method is written to the file in step 913. Step 914 examines the next node in the current list. Control flows to step 914 after the processing of action nodes in step 904, 908, 911, 912 and 913. The decision node in step 915 checks whether next a node exists. If node exists, control flows to step 905 else control flows to the final node in step 916.

Figure 10:
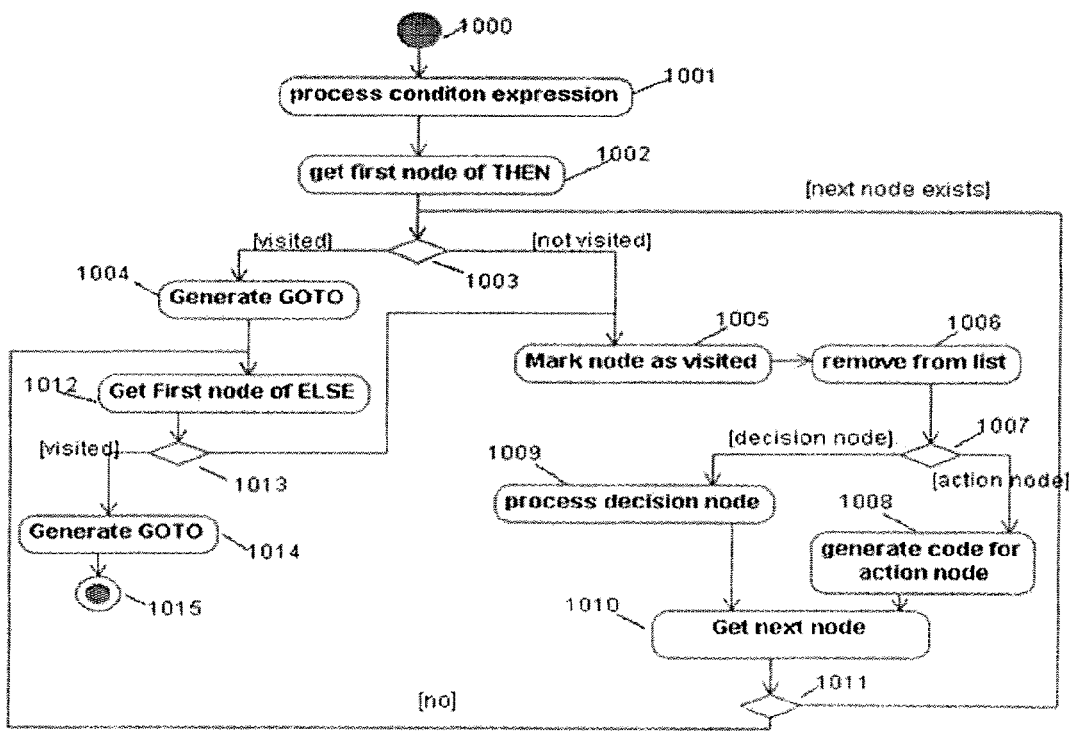
FIG. 10 shows an activity diagram describing the steps to generate executable bytecode for a loop structure according to the embodiments of the invention.
Figure 11:
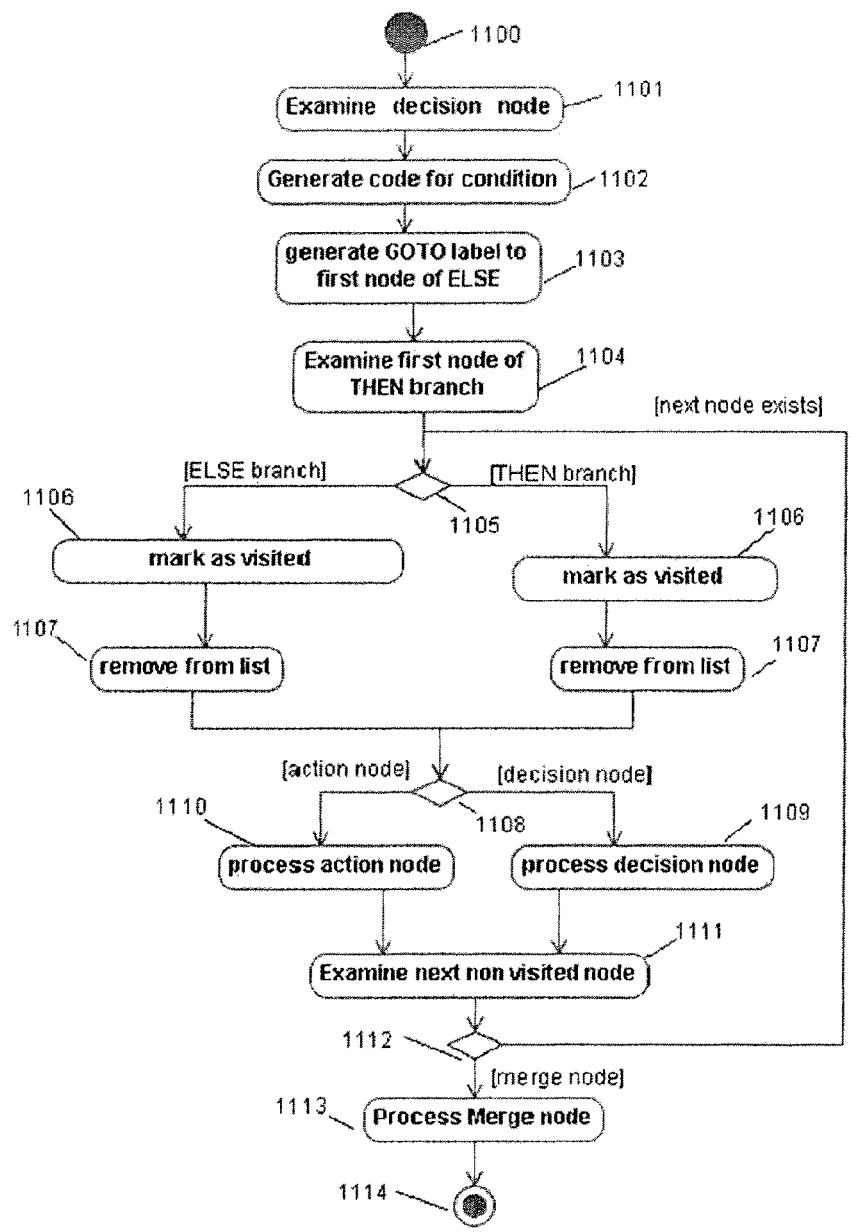
FIG. 11 shows an activity diagram describing the steps to generate executable bytecode for a conditional construct according to the embodiments of the invention.

FIG. 10 depicts the activity diagram for generating executable bytecode for the loop. A loop usually has two parts. If the loop condition is satisfied a set of statements will be executed repetitively until the condition becomes false. This branch shall be termed as the Then branch. The statements that will be executed if the condition becomes false shall be termed as the Else branch. One of the branches of the decision node will always branch to an already visited node.

Loop processing starts with the initial node in step 1000. In step 1001, the loop condition is analyzed to generate bytecode for the condition. Loop control variables are identified. A label is associated with the condition check inorder to effect a branch to the first statement of the loop for repeated execution. Bytecode for loop initialization is written to bytecode file. The label- and the loop condition are mapped to the corresponding bytecode. The first node of Then branch is examined in step 1002. Step 1003 checks whether the first node is already visited. If the node is visited, a loop is identified and a goto statement to the label of the node is written to the file in step 1004. Bytecode generation for the Then branch is complete and the nodes of the Else branch are examined for executable bytecode generation. The Else branch is examined in step 1012.

In step 1003, if the node is an unvisited node, control flows to step 1005. Any node for which bytecode generation is being performed is marked as visited. Mark the node as visited in step 1005. Remove from the list of nodes since executable bytecode is generated for the node. This function is performed in step 1006. Inorder to generate executable bytecode, the node type has to be identified. Step 1007 performs this check. Control branches to step 1008 if the current node is an action node and to step 1009 if the node is a decision node.

Step 1008 generates the executable bytecode for action node as detailed in steps 906 to 908. Step 1009 processes the decision node to generate executable bytecode. After bytecode generation is performed, the next node is examined in step 1010. If next node exists in the list (step 1011), it is examined in step 1003. If node does not exist, control branches to examining the Else branch. Control flows to step 1012 from steps 1011 and 1004. Step 1012 examines the first node of Else branch. If the node is an unvisited node, control flows to step 1005. If the check performed by step 1013 identifies the node as already visited, bytecode generation corresponds to creation of a goto statement to the label of the visited node in step 1014. Since the node has been visited before, bytecode has been generated for the node and code generation requires only a goto statement to the label of the node. Bytecode generation for the loop is completed in step 1015.

FIG. 1100 represents the activity diagram for the executable bytecode generation of a conditional expression. A conditional expression is an If-Then-Else construct. The decision node evaluates a conditional expression. If the condition evaluates to true, the Then branch is followed. If the condition evaluates to false, the Else branch is followed. The branches finally merge at a common node which is an action node.

Processing starts with the initial node in step 1100. Step 1101 examines the decision node. The conditional expression is identified, the attributes involved in the expression and the labels of Then and Else branches are also identified. Step 1102 generates the executable bytecode for the conditional expression. A goto statement to the label of the first node in the list of Else nodes is also associated with the executable bytecode for conditional expression in step 1103.

Step 1104 examines the first node of the Then branch. Steps 1105 to 1112 are executed repetitively until no more nodes are to be examined. The executable bytecode generation steps are the same for Else branch and Then branch. The nodes of the Then branch are examined first and later the nodes of the Else branch are examined. Executable bytecode generation process ends with the process of bytecode generation of the action node where the Then and Else branches merge in step 1113 and the final node in step 1114.

Step 1105 examines whether the current node belongs to the Then branch or Else branch. Control flows to step 1106 if it belongs to either the Then branch or Else branch. In step 1106, the node is marked as visited and removed from the list of nodes in step 1107. The nodes for which executable bytecode is generated is labeled as visited. After bytecode generation, the list for the conditional statements shall be empty.

The type of node is checked by the decision node in step 1108. If the node is a decision node, control flows to step 1109. If the node is an action node, control flows to step 1110. In step 1109, the decision node is processed and bytecode is generated according to the steps outlined in FIGS. 10 and 11. In step 1110, processing of action node is, performed and bytecode generation is based on the steps 906, 907 and 908 outlined in FIG. 9.

After processing the node and generating executable bytecode, control flows from steps 1109 and 1110 to step 1111. The next non visited node in the current list is examined in step 1111. The list can be either the list associated with the Then branch or Else branch. If a node exists in the decision check of step 1112, control branches to step 1105 else control branches to step 1113. Steps 1105 to 1112 are executed repeatedly until the Then and Else lists are exhausted. First the nodes in the Then list is examined followed by the nodes in the Else list. After bytecode generation for the Then list is exhausted, a bytecode statement containing goto to the label of the merge node is written to the bytecode file. The processing of action node is performed in step 1113. Executable bytecode generation process ends at the final node in step 1114.

The disclosure provides an efficient method for automatic generation of executable bytecode from an autobytecode model and also verifying the syntactic correctness of the diagram before generating executable bytecode.

With the embodiments disclosed therein, we have verified the syntactic correctness of the activity diagrams thereby eliminating syntax errors that can occur during design stage.

With the embodiments disclosed therein, the autobytecode model generated from syntactically correct diagrams are used to determine the execution sequence that includes sequential flow of control, loops and conditional constructs.

With the embodiments disclosed therein, executable bytecode is generated based on the execution sequence and written to a file.

The method requires several stages. In the first stage, requirements are modelled using a UML tool and a diagram parser extracts the components of the diagram. Syntax verification and autobytecode model generation constitutes the second stage where each component is verified against its syntactic specification and an autobytecode model is generated from the syntactic specification. The execution sequence is determined from the autobytecode model in the third stage. The fourth stage comprises of executable bytecode generation from the execution sequence.

Activity diagrams depict the control flow behavior of the system. Any type of system can be modelled using class and activity diagrams. The disclosure can be applied to any type of activity diagram and it generates bytecode for sequential, looping and conditional constructs.

The invention may be implemented in software. The embodiment of the invention can be implemented as a computer program executing on programmable computers each comprising a processor, a data storage system, at least one input device and at least one output device. Design diagrams are given as input to the program code and output is the executable bytecode resulting in execution of the design model.

The programs for the different modules are implemented preferably in a platform independent high level object oriented programming language. Each such program is stored on a non-volatile memory. The output of the bytecode generation phase is the executable bytecode generated for the design model. The bytecode can be executed on any java virtual machine running on any platform to produce output. The syntactically correct diagrams are converted to an autobytecode model and the automatic translation of autobytecode model to executable bytecode produces accurate and efficient platform independent code that can be executed on any platform having java virtual machine running on top of it.

The invention claimed is:

1. A method of generating an executable bytecode from syntactically correct class and activity diagrams designated as autobytecode model, the method comprising the following steps:
   A. automating a bytecode generation process from the autobytecode model, wherein the bytecode generation process avoids generation of Java code:
   B. parsing an Unified Modified Language (UML) diagram to identify one or more components of the UML diagram;
   C. verifying syntactic correctness of each component of the UML diagram;
   D. identifying a sequential flow of execution in the autobytecode model;
   E. identifying one or more loops and conditional constructs;
   F. generating executable bytecode directly from the autobytecode model created from UML design models;
   G. maintaining consistency between the UML model and the generated executable bytecode; and
   H. generating platform independent bytecode executable on any computing platform,
wherein step A, further comprises:
   examining an execution sequence;
   identifying one or more activities represented by one or more action nodes and decision
   nodes in the execution sequence; and
   identifying one or more attributes involved in the one or more activities and mapping the one or more action nodes and decision nodes to equivalent executable bytecode according to the activities specified in the one or more action nodes and decision nodes without using a programmer and without writing a high level language program.

2. The method according to claim 1, wherein step B. further comprising:
   utilizing a diagram parser to parse one or more class and activity diagrams to identify the one or more UML diagram components and producing a specification of the diagram.

3. The method according to claim 2, wherein step C. further comprising:
   utilizing a syntax verifier to analyze each component of the UML diagram against their syntactic specification to create the autobytecode model.

4. The method according to claim 3, further comprising:
   determining whether each node has a desired number of incoming and outgoing edges and does not lead to a break in control flow.

5. The method according to claim 4, further comprising:
   determining whether all branches from a decision node have guard conditions and do not lead to:
   i) missing guard conditions thereby causing inconsistency; and
   ii) whether the guard conditions are mutually exclusive and do not lead to identical guard
   conditions error thereby causing ambiguity and inconsistency.

6. The method according to claim 1, wherein step D. further comprising:
   starting with an initial node, identifying a next node in the sequence and determining whether the next node is an action node that forms part of the sequential execution and, if so, adding it to a list of nodes in the sequential flow of execution.

7. The method according to claim 1, wherein step E. further comprising:
   examining a decision node;
   determining whether one of an outgoing edge from the decision node merges at a previously visited node and, if so, identifying a corresponding loop construct; and
   determining whether there is a common node where a "Then and Else" conditional construct branch merges and, if so, determining a corresponding conditional "If-Then-Else" construct.

8. The method according to claim 1, wherein step F. is based on the execution sequence identified from the autobytecode model.

9. The method according to claim 1, wherein step G. further comprising:
automatically determining whether the UML model is syntactically correct and, if so, converting the UML model to an autobytecode model.

10. The method according to claim 9, further comprising:
determining the execution sequence and automating the process of bytecode generation directly from the autobytecode model.

11. The method according to claim 1, wherein step H. further comprising:
generating a platform independent bytecode executable on a Java Virtual Machine running on either a Windows platform or a Linux platform.

* * * * *